(12) United States Patent
Berglund et al.

(10) Patent No.: US 11,490,298 B2
(45) Date of Patent: Nov. 1, 2022

(54) INTER-FREQUENCY SEARCH ORDER

(71) Applicant: Telefonaktiebolaget LM Ericsson (publ), Stockholm (SE)

(72) Inventors: Joel Berglund, Linköping (SE); Henrik Rydén, Solna (SE); Mirsad Cirkic, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/644,828

(22) PCT Filed: Oct. 1, 2018

(86) PCT No.: PCT/EP2018/076625
§ 371 (c)(1),
(2) Date: Mar. 5, 2020

(87) PCT Pub. No.: WO2019/068628
PCT Pub. Date: Apr. 11, 2019

(65) Prior Publication Data
US 2021/0076272 A1    Mar. 11, 2021

Related U.S. Application Data

(60) Provisional application No. 62/567,164, filed on Oct. 2, 2017.

(51) Int. Cl.
*H04W 36/00*     (2009.01)
*H04W 24/10*     (2009.01)
(52) U.S. Cl.
CPC ....... *H04W 36/0072* (2013.01); *H04W 24/10* (2013.01); *H04W 36/0085* (2018.08); *H04W 36/00835* (2018.08)

(58) Field of Classification Search
CPC ....... H04W 36/0083; H04W 36/00835; H04W 36/0085; H04W 36/088; H04W 36/0094;
(Continued)

(56) References Cited

U.S. PATENT DOCUMENTS

2006/0014538 A1   1/2006  Yuan
2015/0312805 A1*  10/2015 Cui ........................ H04W 48/10
                                                          370/331
(Continued)

FOREIGN PATENT DOCUMENTS

WO    2003005759 A1    1/2003
WO    2004025983 A1    3/2004

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC) Protocol Specification (Release 14)", Technical Specification, 3GPP TS 36.31 V14.3.0, Jun. 1, 2017, pp. 1-745, 3GPP.

(Continued)

*Primary Examiner* — Nam T Huynh
(74) *Attorney, Agent, or Firm* — Coats + Bennett, PLLC

(57) ABSTRACT

A method (420) performed by a network node (102, 700, 800, 960a, 1320) for channel selection for inter-frequency handover. The method comprises generating (400) information usable by a user equipment (UE) (101, 500, 600, 910a, 1330) for determining a sequence of channels to be successively measured by the UE for availability for inter-frequency handover. The method comprises transmitting (410) the information to the UE. A method (320) performed by a wireless device for measuring channels available for inter-frequency handover. The method comprises determining (300) a channel order defining a sequence of channels to be successively measured for availability for inter-frequency (Continued)

handover. The method comprises performing (310) measurement of the channels according to the channel order.

22 Claims, 18 Drawing Sheets

(58) Field of Classification Search
CPC ......... H04W 36/0058; H04W 36/0061; H04W 24/10
See application file for complete search history.

(56) References Cited

U.S. PATENT DOCUMENTS

| | | |
|---|---|---|
| 2015/0327286 A1 | 11/2015 | Yiu et al. |
| 2015/0341813 A1* | 11/2015 | Kemmer ............. H04L 43/0894 370/252 |
| 2016/0219487 A1* | 7/2016 | Khawer ............. H04W 52/0277 |
| 2017/0295574 A1* | 10/2017 | Stark ................. H04W 72/0453 |
| 2018/0139715 A1* | 5/2018 | Ly ..................... H04W 56/0035 |
| 2019/0182694 A1* | 6/2019 | Martin ................ H04W 24/10 |

OTHER PUBLICATIONS

3rd Generation Partnership Project, "3rd Generation Partnership Project; Technical Specification Group Radio Access Network; NR; Radio Resource Control (RRC); Protocol Specification (Release 15)", Technical Specification, 3GPP TS 38.331 V0.0.4, Jun. 1, 2017, pp. 1-22, 3GPP.

* cited by examiner

INTER-FREQUENCY SEARCH ORDER

TECHNICAL FIELD

The present disclosure relates generally to channel selection, and more particularly to channel selection for inter-frequency handover.

BACKGROUND

Mobility is an important part of Third Generation Partnership Project (3GPP) technologies such as Global System for Mobile Communications (GSM), High Speed Packet Access (HSPA), Long Term Evolution (LTE) and will also be so in Fifth Generation (5G). Mobility provides a seamless experience by allowing the cell handover procedure to be unnoticed by a user of the user equipment (UE) being handed over. As traffic increases, more carriers are needed to handle increased network load. With the increased number of carriers comes a greater number of carriers to monitor for inter-frequency handover targets.

Machine learning has experienced a large growth thanks to the recent years of publicity, new algorithms, more powerful hardware, and the possibility to handle, store, and process large amounts of data. Machine learning typically builds a prediction model based on historical data, and is useful when no obvious relation resides between the historical data (input) and what is predicted (output).

Performing inter-frequency measurements typically requires UEs to reconfigure their receive chains to a different frequency carrier from that in the source cell, unless the UE supports multiple receive chains that can measure simultaneously on several frequency carriers. If the UE has a single receive chain, it is unable to receive signals from the source cell while it is performing measurements on other carrier frequencies. In either case, UE battery consumption increases as the number of monitored carriers becomes greater. Likewise, with further carrier candidates comes a longer total frequency search period. This problem is to become especially acute with the upcoming deployment of 5G networks which will require UEs to measure even more carriers. In many instances, a substantial number of the measured carriers lack coverage, which renders significant measurement periods effectively wasted. And if the inter-frequency search/measurement is random, the inefficient UE carrier search duration can become especially large.

SUMMARY

Certain aspects of the present disclosure and their embodiments may provide solutions to these or other challenges. In particular, the present disclosure presents techniques for searching for inter-frequency carriers in specific orders.

Embodiments herein include a method performed by a network node for channel selection for inter-frequency handover. The method comprises generating information usable by a user equipment (UE) for determining a sequence of channels to be successively measured by the UE for availability for inter-frequency handover. The method comprises transmitting the information to the UE.

In one or more embodiments, the information comprises a channel order defining the sequence of channels. For instance, in an example embodiment, probabilities of coverage in each frequency are used to set the channel order (e.g., a UE inter-frequency search order). The probabilities can be predicted using machine learning (ML), for example based on serving Reference Signal Received Power (RSRP) and intra-frequency RSRP measurements. This probability is used to choose the search order which is statistically optimal from a search time point of view. Examples of usage would be in inter-frequency handover and load balancing situations where a UE would like to find suitable candidates as soon as possible.

Embodiments herein include a method performed by a UE for measuring channels available for inter-frequency handover. The method comprises determining a channel order defining a sequence of channels to be successively measured for availability for inter-frequency handover. The method comprises performing measurement of the channels according to the channel order.

In one or more embodiments, the determining a channel order comprises receiving information indicating the channel order at the wireless device.

In one or more embodiments, the channel order is a function of probabilities of coverage for each of the channels. For instance, the search order can be set (e.g., by the network) based on the estimated probability of finding a usable frequency/carrier of interest at each of the measured frequencies/carriers.

In one or more embodiments, the channel order is selected so as to optimize search time duration or other Key Performance Indicators (KPI), such as faster inter-frequency handover. For instance, frequencies can be divided into different sets, where the sets are chosen in order to optimize certain KPI, such as mean search time.

In one or more embodiments, the channel order is selected based on weighting derived from channel-specific frequency information (e.g., a frequency priority). For example, frequency priority can be set based on load-balancing considerations.

In one or more embodiments, the channel order is based on overlap information (e.g. overlap in UEs who can detect or measure a particular frequency).

In one or more embodiments, the channel order is selected based on probability calibration for the channels. When different models are used for different target frequencies, the estimated probabilities and the real probabilities naturally may not be equal, especially not when comparing the different models. For such cases, probability calibration can be performed (or at least the uncertainty can be taken into account).

In one or more embodiments, the channel order is based on an uncertainty in probability.

In one or more embodiments, the channel order is determined by machine learning techniques.

Certain embodiments may provide faster inter-frequency handover, smaller/fewer measurement gaps, and may produce higher throughput, among other positives as will be described below in the context of specific examples.

DETAILED DESCRIPTION

Figure 3:
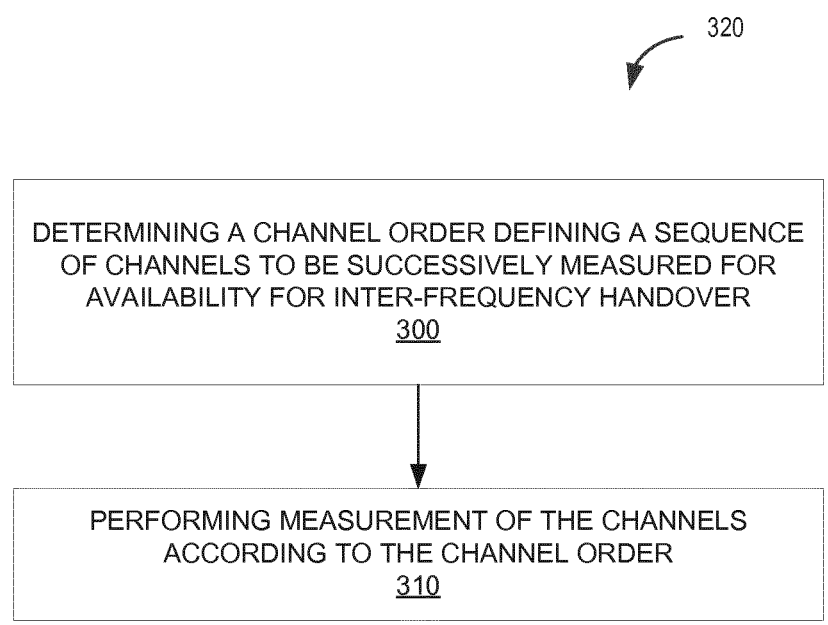
FIG. 3 is a flowchart illustrating a method for measuring channels according to an embodiment.

FIG. 3 depicts a method 320 performed by a wireless device (WD) (i.e. a UE or other mobile device) in accordance with particular embodiments. The method includes at block 300 determining a channel order defining a sequence of channels to be successively measured for availability for inter-frequency handover. In addition, at block 310, the method includes performing measurement of the channels according to the channel order. In an aspect, the wireless device may perform channel management until a signal is detected on a channel from the sequential channel order measurements, and may perform inter-frequency handover to this channel. In some examples, the channel order is determined by the wireless device. Furthermore, in some instances, the channel order is determined as a function of probabilities of coverage for each of the channels. Embodiments can include the probabilities of coverage being received from a network node. A network node includes, for example, an Evolved Universal Terrestrial Radio Access Network NodeB (eNodeB), nodeB, new radio (NR) base station (gNB), and a Mobility Management Entity (MME).

Additionally, the channel order may be selected so as to optimize KPI, such as search time duration or other criteria related to a faster inter-frequency handover. In some instances, the channel order is selected based on weighting derived from channel-specific frequency information. In some examples, the channel-specific frequency information comprises a frequency priority. In addition, in some examples, determining the channel order further includes dividing the channels into a plurality of channel sets based on a key performance indicator optimization target and selecting the search order based on the channel sets.

In some cases the search order is set or controlled by the network (e.g., based on an estimated probability of finding a usable frequency/carrier of interest at each of the measured frequencies/carriers). In other cases, the frequency order is not controlled by the network. For example, frequencies can be divided into different sets where the sets are chosen in order to optimize a certain KPI.

In some examples, the channel order is determined by machine learning techniques, and in some examples the channel order is determined based on overlap information. Additionally, some examples include the wireless device determining the channel order by performing probability calibration for the channels and/or based on an uncertainty in probability.

In some examples, the channel order is determined by a network node and information indicating the channel order is received at the wireless device from the network node. Furthermore, in an aspect of some examples, the method may include providing user data and forwarding the user data to a host computer via the transmission to the base station. The above aspects of the method of FIG. 3 are further expanded upon below (as well as above).

Figure 4:
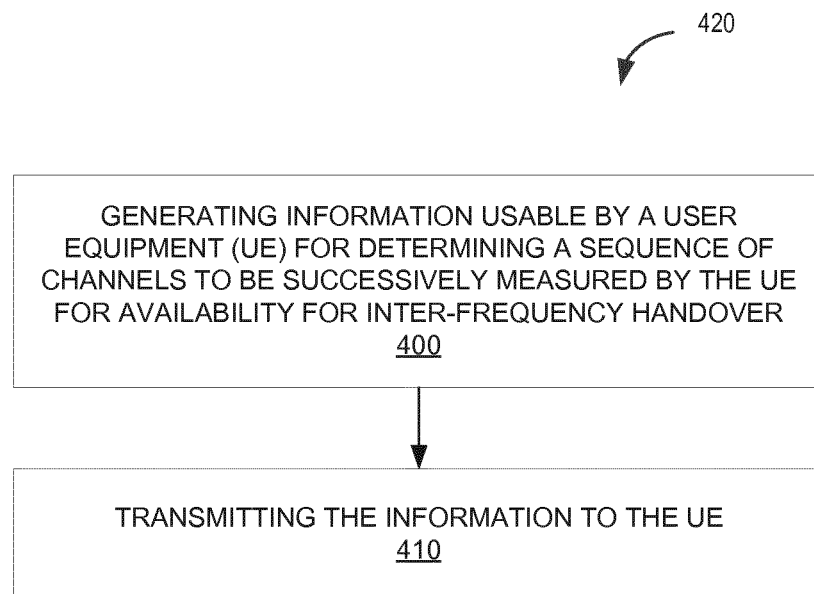
FIG. 4 is a flowchart illustrating a method for channel selection according to an embodiment.

FIG. 4 depicts a method 420 in accordance with other particular embodiments that is performed by a network node for channel selection (or assistance thereof by a UE) for inter-frequency handover of the UE. As shown in block 400 of FIG. 4, the method may include generating information usable by a UE for determining a sequence of channels to be successively measured by the UE for availability for inter-frequency handover. In addition, at block 410, the method of FIG. 4 may include transmitting the information to the UE. In addition, although not explicitly shown in FIG. 4, the information may include a channel order defining the sequence of channels and/or probabilities of coverage for each of the channels.

In some instances, channel order is selected so as to optimize search time duration in the method of FIG. 4. In other examples, the channel order can be selected based on weighting derived from channel-specific frequency information. In some examples, the channel-specific frequency information comprises a frequency priority. Some examples include a feather of the channel order being determined by machine learning techniques. In addition, the method can include obtaining user data and forwarding the user data to a host computer or a wireless device.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
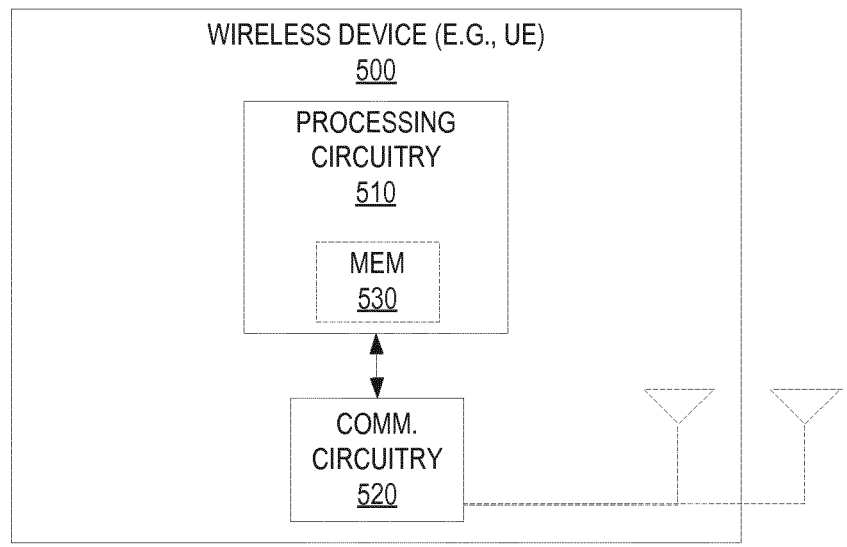
FIG. 5 is a block diagram illustrating a wireless device according to an embodiment.

FIG. 5 for example illustrates a wireless device 500 as implemented in accordance with one or more embodiments. As shown, the wireless device 500 includes processing circuitry 510 and communication circuitry 520. The communication circuitry 520 (e.g., radio circuitry) is configured to transmit and/or receive information to and/or from one or more other nodes, e.g., via any communication technology. Such communication may occur via one or more antennas that are either internal or external to the wireless device 500. The processing circuitry 510 is configured to perform processing described above, such as by executing instructions stored in memory 530. The processing circuitry 510 in this regard may implement certain functional means, units, or modules.

Figure 6:
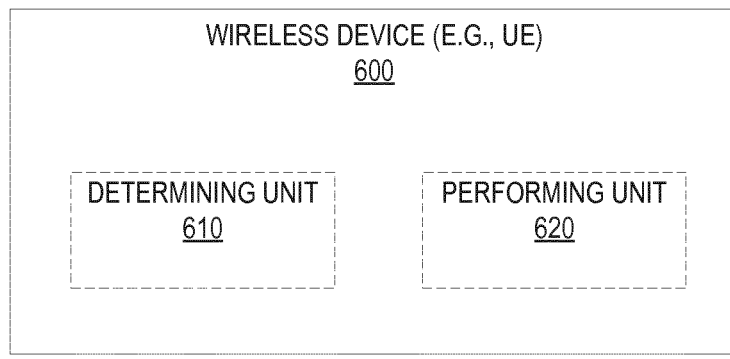
FIG. 6 is a block diagram illustrating a wireless device according to an embodiment.
Figure 9:
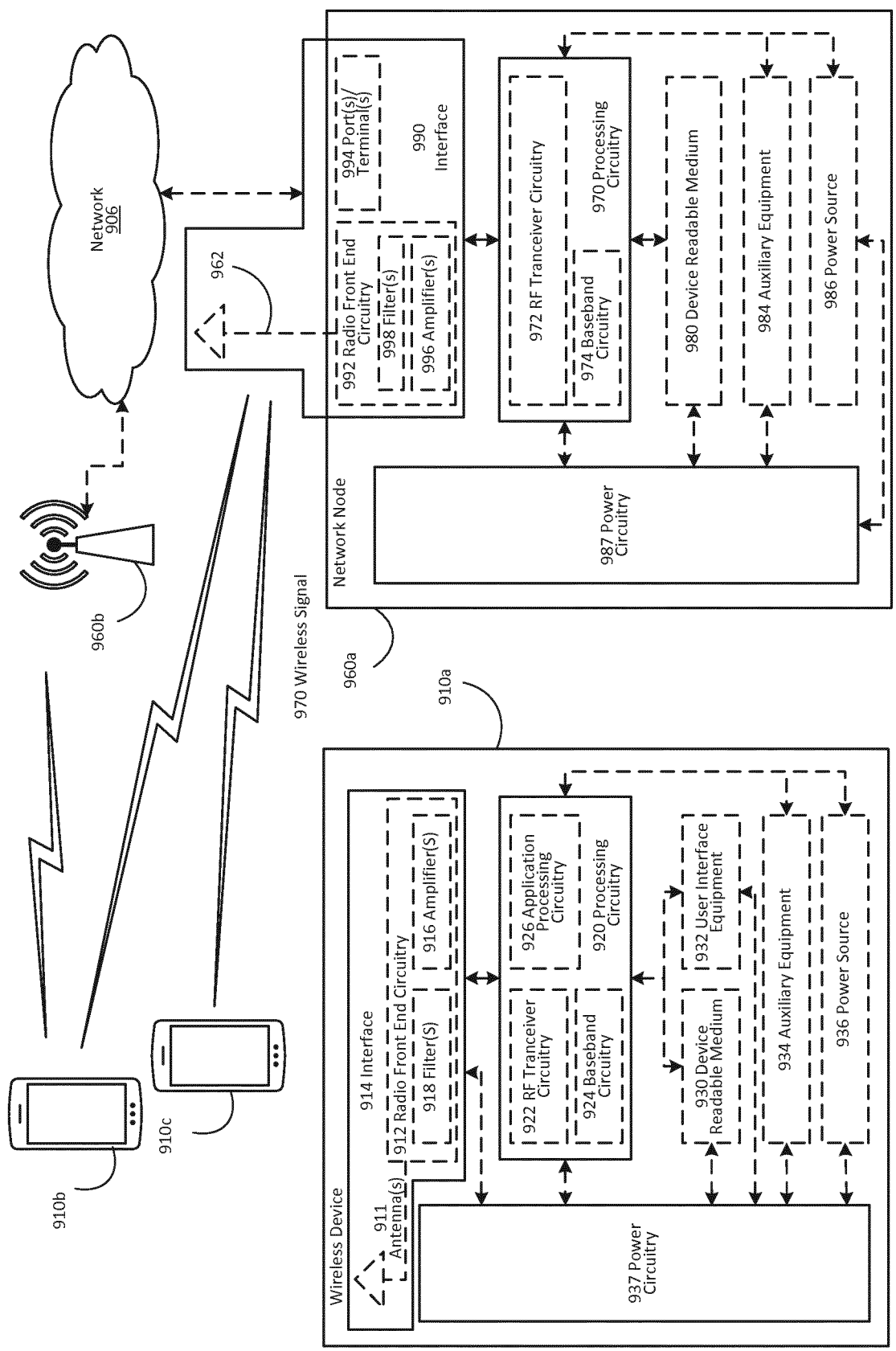
FIG. 9 illustrates an exemplary wireless network according to an embodiment.

FIG. 6 illustrates a schematic block diagram of an wireless device 600 in a wireless network according to still other embodiments (for example, the wireless network shown in FIG. 9). As shown, the wireless device 600 implements various functional means, units, or modules, e.g., via the processing circuitry 510 in FIG. 5 and/or via software code. These functional means, units, or modules, e.g., for implementing the method(s) herein, include for instance: determining unit 610 configured to perform block 300 of FIG. 3 and performing unit 620 configured to perform block 310 of FIG. 3.

Figure 7:
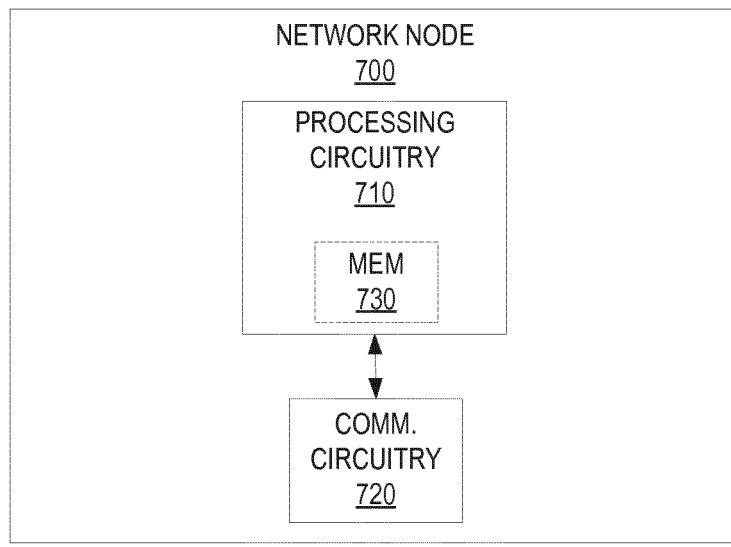
FIG. 7 is a block diagram illustrating a network node according to an embodiment.

FIG. 7 illustrates a network node 700 as implemented in accordance with one or more embodiments. As shown, the network node 700 includes processing circuitry 710 and communication circuitry 720. The communication circuitry 720 is configured to transmit and/or receive information to and/or from one or more other nodes, e.g., via any communication technology. The processing circuitry 710 is configured to perform processing described above, such as by executing instructions stored in memory 730. The processing circuitry 710 in this regard may implement certain functional means, units, or modules.

Figure 8:
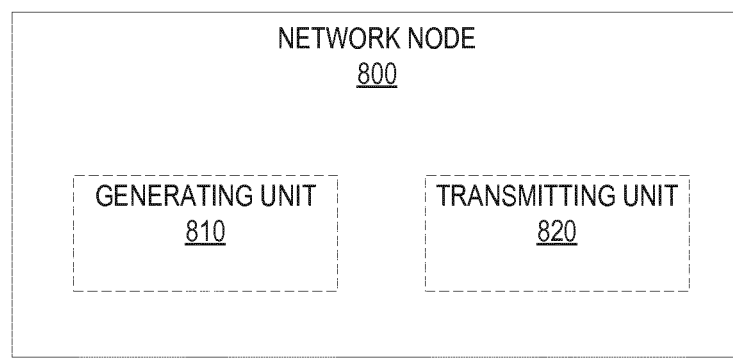
FIG. 8 is a block diagram illustrating a network node according to an embodiment.

FIG. 8 illustrates a schematic block diagram of an network node 800 in a wireless network according to still other embodiments (for example, the wireless network shown in FIG. 9). As shown, the network node 800 implements various functional means, units, or modules, e.g., via the processing circuitry 710 in FIG. 7 and/or via software code. These functional means, units, or modules, e.g., for implementing the method(s) herein, include for instance: generating unit 810 for performing block 400 of FIG. 4, and transmitting unit 820 for performing block 410 of FIG. 4.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium. Additional embodiments will now be described. At least some of these embodiments may be described as applicable in certain contexts and/or wireless network types for illustrative purposes, but the embodiments are similarly applicable in other contexts and/or wireless network types not explicitly described.

Figure 1A:
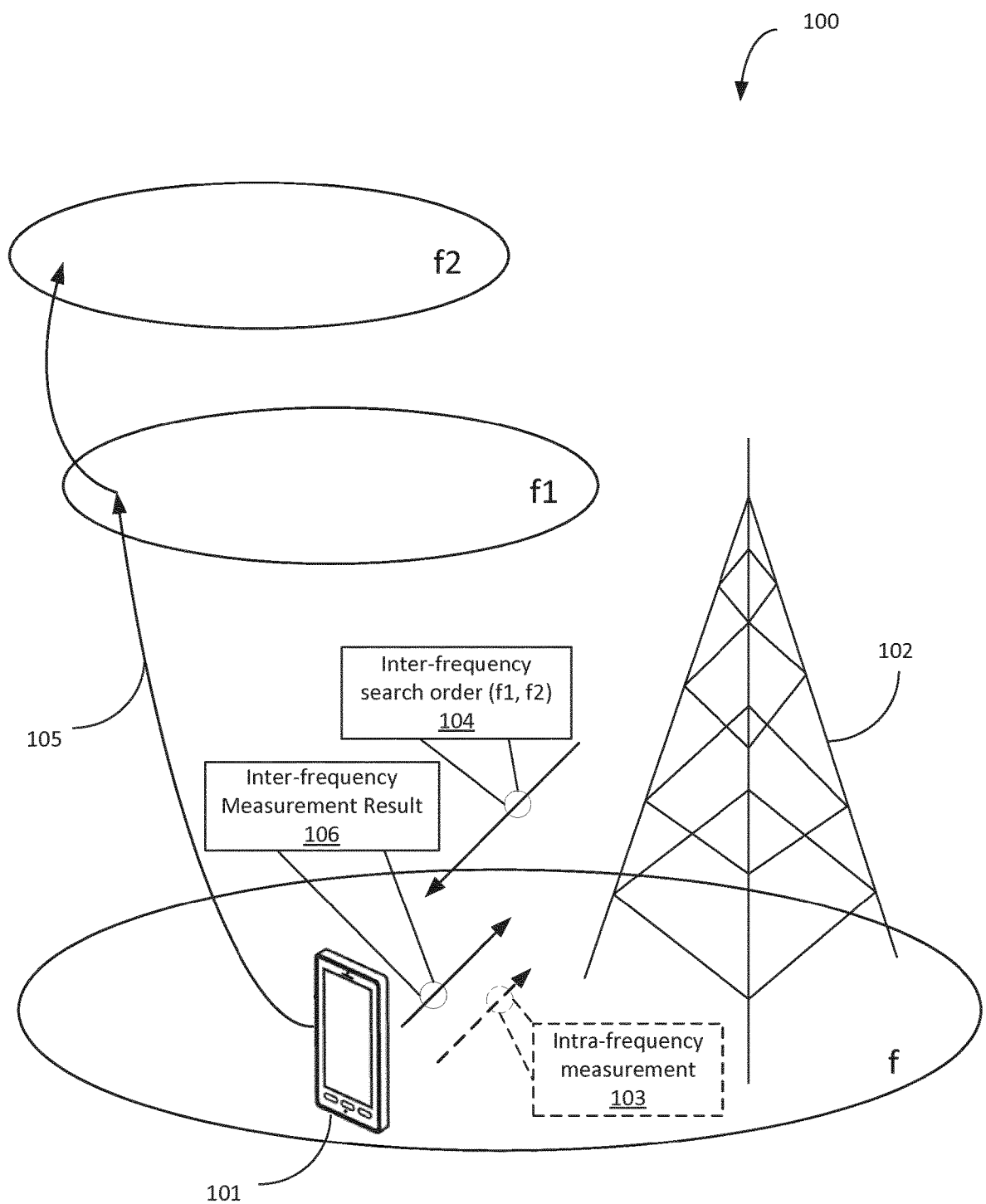
FIG. 1A illustrates an exemplary exchange of an inter-frequency search order according to an embodiment.

FIG. 1A presents an overview of example embodiments discussed herein, for a network 100 where a UE 101 is connected to a network node 102 (e.g., an eNodeB) on frequency f, and the network node 102 seeks to offload the UE 101 to carrier frequency f1 or f2. FIG. 1A illustrates how inter-frequency search order 104 is reported to the UE 101 who conducts inter-frequency measurements 105 according to the inter-frequency search order 104 (in FIG. 1A, for example, f1 is followed by f2 in the search order).

The inter-frequency search order 104 can be reported in one or more messages or configurations. For example, if there are two or more inter-frequency carriers and the default search order configuration is random, the network node 102 could first order the UE 101 to search for one specific frequency only. If it is not found, a new configuration can be made to search for the other carrier, and by doing so, another search order is created.

The inter-frequency measurement results 106 are reported to the network node 102 (e.g., by reporting information related to the inter-frequency measurements 105 or a handover candidate as described herein). The network node 102 performs an action based on the received inter-frequency measurement results 106. Such an action may include an inter-frequency handover. In an optional aspect, the network node 102 updates the inter-frequency probability estimate based on received inter-frequency measurements 105.

FIG. 1A also illustrates how the UE 101 can optionally first report one or more intra-frequency measurements 103 to the network node 102. For example, the network node 102, in turn, can use the intra-frequency measurements 103 to improve the UE 101 coverage probability estimate on another carrier frequency. According to the present disclosure, the terms "coverage probability," "coverage probability estimate," "probability estimate," "probability," or the like can refer to a probability of a given frequency band (also referred to herein as simply "frequency" or as a "carrier," "sub-carrier," or "component carrier") being suitable for selection as a frequency over which wireless communication can take place between devices (i.e. a UE and network node). The probabilities are then used to calculate the inter-frequency search order 104, which is the order in which frequency candidates are measured by the UE 101 to determine whether UE 101 communication can be switched to the frequency. In some examples a UE 101 can stop the search when it has detected a cell on another carrier. Of course, UE 101 may search to detect several cells (e.g., in searching for candidates cells for handover as described herein).

Figure 1B:
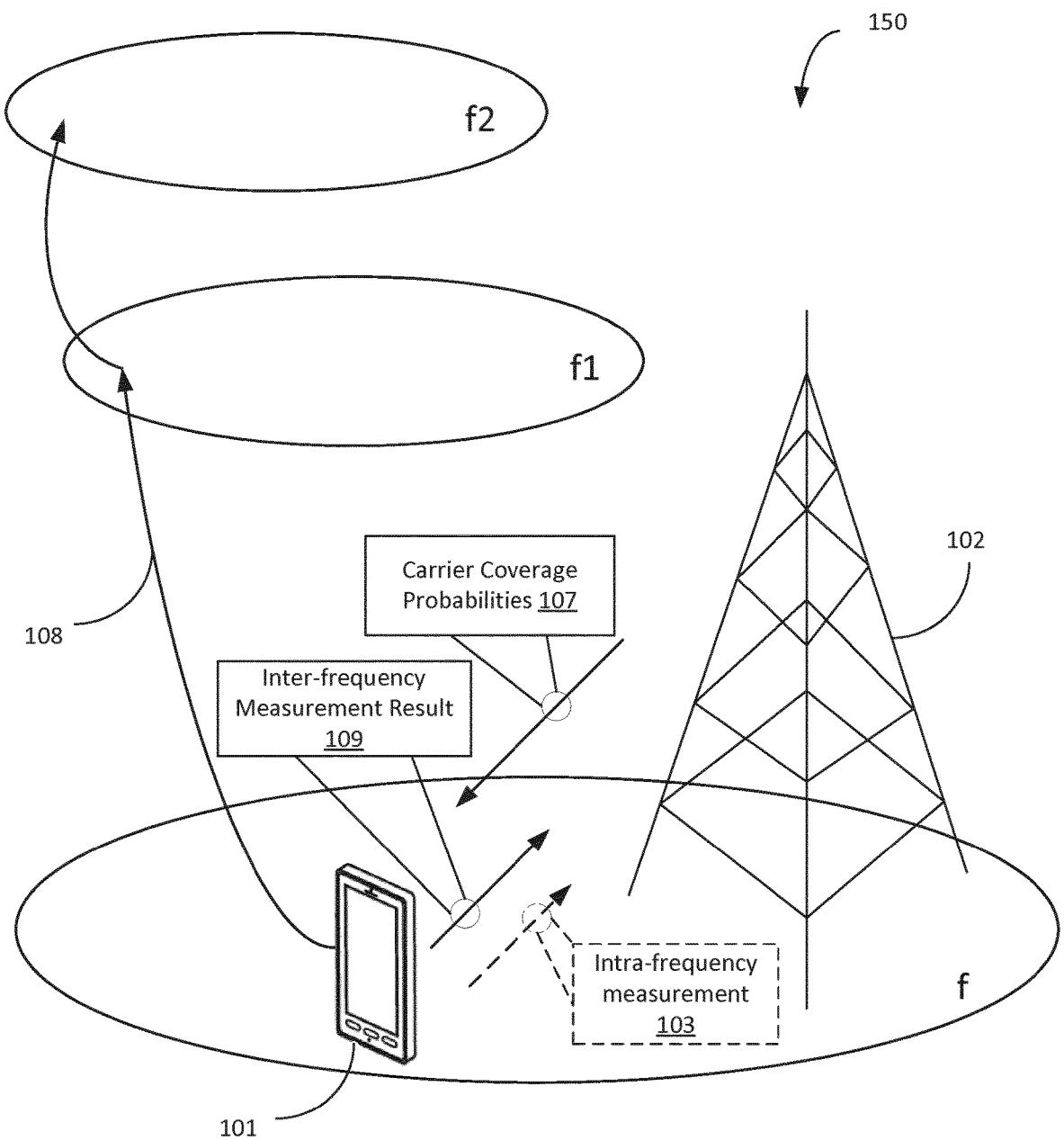
FIG. 1B illustrates an exemplary exchange of carrier coverage probabilities according to an embodiment.

In another example embodiment illustrated in FIG. 1B for a network 150, carrier coverage probabilities 107 are reported to the UE 101 from a network node 102, and the UE 101 then selects a search order based upon these probabilities (e.g., what target frequency to measure and in which order). As shown in FIG. 1B, the UE 101 has selected an inter-frequency search order of f1 and then f2 and conducts the inter-frequency measurements 108 according to that inter-frequency search order. The inter-frequency measurement results 109 are reported to the network node 102 (e.g., by reporting information related to the inter-frequency measurements 108 or a handover candidate as described herein). FIG. 1B also illustrates how the UE 101 can optionally first report one or more intra-frequency measurements 103 to the network node 102. The network node 102 can use these measurements for instance to determine the carrier coverage probabilities 107.

The UE 101 in the same or different embodiments can use information not shown in FIGS. 1A and 1B in addition to information received from network node 102 to determine a search order. For instance, the additional information may be UE-specific frequency information. In some examples, the additional information at the UE 101 can be the battery level of UE 101. For instance, lower probability frequencies can be measured more frequently when a battery level is relatively high. The less probable carriers are typically deployed at higher frequencies, and are usually less occupied, which results in good communication properties in case of UE coverage should these frequencies be searched. The additional information can also be the UE 101 search time duration. Some advanced UEs are configured to perform inter-frequency measurements faster than other UEs.

The network can get the probabilities of coverage based on, for instance, cell overlap (i.e., a percentage of UEs within the cell that could detect a cell on another carrier, for example if 100 UEs measure on one cell, and 20 detects a cell on another carrier, the cell overlap is 20%). Though sufficient, this cell overlap method is a relatively crude estimation with only one value per cell and frequency.

A relatively more advanced method to calculate a more accurate probability is to use machine learning (ML) methods. In an aspect, an ML model can be constructed by collecting source carrier measurements and modeling coverage on one or more frequencies based on these measurements over time. In an aspect, these carrier radio condition measurements can include one or more of:

Radio signal strength from one or more cells at the source carrier

Precoder Matrix Indicator (PMI) of the serving carrier, antenna beam indicator, angle of arrival.

Timing advance (TA) of the serving carrier

Uplink radio condition measurements at a network node

Uplink angle of arrival measurements at a network node

The probability of coverage for each carrier can be used directly to select the frequency search order such that the frequency with highest probability is selected first, and the second highest is selected second, and so on. In an example embodiment, frequency information is combined with the probabilities to select the search order. In some examples, the frequency information can comprise one or both of:

Frequency priority—It might be favorable to offload to certain frequencies, for example, from a load-balancing perspective. As an example, it is typically better to offload to, and search first, high frequencies from a load-balancing perspective because higher frequencies are usually less occupied. One of ordinary skill in the art will appreciate other factors or criteria, which may be considered from a load-balancing perspective, e.g., factors or criteria related to how many users are connected to a particular frequency.

Search time—Some frequencies can require longer search time for the UEs to detect if it is hearable or not. In general, 5G nodes deployed at mmWave (>30 GHz) will have different properties in comparison with low-carrier LTE (800 MHz).

In FIG. 1A, the search order is reported from the network node to the UE, which can use the search order when performing inter-frequency measurements. However, in another embodiment of the invention shown in FIG. 1B, the probabilities are reported to the UE, and the UE then selects the search order. Regardless, the search order can be determined by combining the probabilities with UE-specific frequency information. In an aspect, this UE-specific frequency information can be one or more of:

Search times—Different UEs might have different search times for different frequencies Battery level—In case of low battery level, the UE cannot afford measuring in vain, while a UE with high battery level can afford measuring on a less probable carrier. The less probable carriers are typically deployed at higher frequencies, and are usually less occupied which results in good communication properties in case of UE coverage.

Preferred frequencies—Some UEs might operate better on some frequencies than others, for example based on their receiver-chain implementation.

The benefits of ML in embodiments can be illustrated via a few examples. In these examples, the frequency information combined with the probabilities constitute the UE search time, and for purposes of the present explanation, the UE search times can be said to be equal for all frequencies.

First, a few assumptions to make the illustration easier:

A UE is in need of an inter-frequency handover and quickly needs to find any appropriate carrier to which to obtain coverage.

There are three carriers apart from the serving carrier that are available in the area, and the overlap from the serving cell and carrier is:

20% for carrier 1

20% for carrier 2

70% for carrier 3

The probability of overlap of the different carriers are independent of each other.

When ordering the UE to measure on one or several frequencies:

The search order is random.

The time to find a frequency within coverage is 50 ms.

The time to conclude that a frequency does not have coverage is 100 ms.

If the UE has searched all frequencies and has not found anything, it is assumed that it corresponds to an extra 300 ms.

The time between two searches is 20 ms (in case the carriers are divided into different search sets).

For each of the target carriers a ML model is trained, called model 1, model 2, and model 3, and their respective outputs will be represented by the triplet [$p_1$, $p_2$, $p_3$] representing the estimated probabilities of coverage of the corresponding ML model.

If the UE searches for all frequencies at once, and stops when it has detected a signal on a particular carrier, the expected search time for search case 1 (carrier order 1, 2, 3) would be:

$$20\%*50 \text{ ms}+80\%*20\%*150 \text{ ms}+80\%*80\%*70\%*250 \text{ ms}+80\%*80\%*30\%*(250+300)\text{ms}=251.6 \text{ ms}$$

If the searches are split differently using overlap information, the expected time would decrease. Utilizing the overlap information, start with carrier 3 only, and then carriers 1 and 2 together. The expected time is:

$$70\%*50 \text{ ms}+30\%*20\%*170 \text{ ms}+30\%*80\%*20\%*270 \text{ ms}+30\%*80\%*80\%*(270+300)\text{ms}=167.6 \text{ ms}$$

By utilizing the information of the overlap and what the expected time of searches is, the search order is optimized to reduce the search time.

Using ML further increases this performance. Assume that for one case the ML triplet is [0.8, 0.3, 0.1], meaning that although the statistical average of coverage of the UEs is [0.3, 0.5, 0.7], those probabilities are refined using conditional probabilities, given the inputs to the ML models. This case would give us the following search time:

$$80\%*50 \text{ ms}+20\%*70\%*170 \text{ ms}+20\%*70\%*10\%*290 \text{ ms}+20\%*70\%*90\%*(290+300)\text{ms}=142.2 \text{ ms}$$

Figure 2:
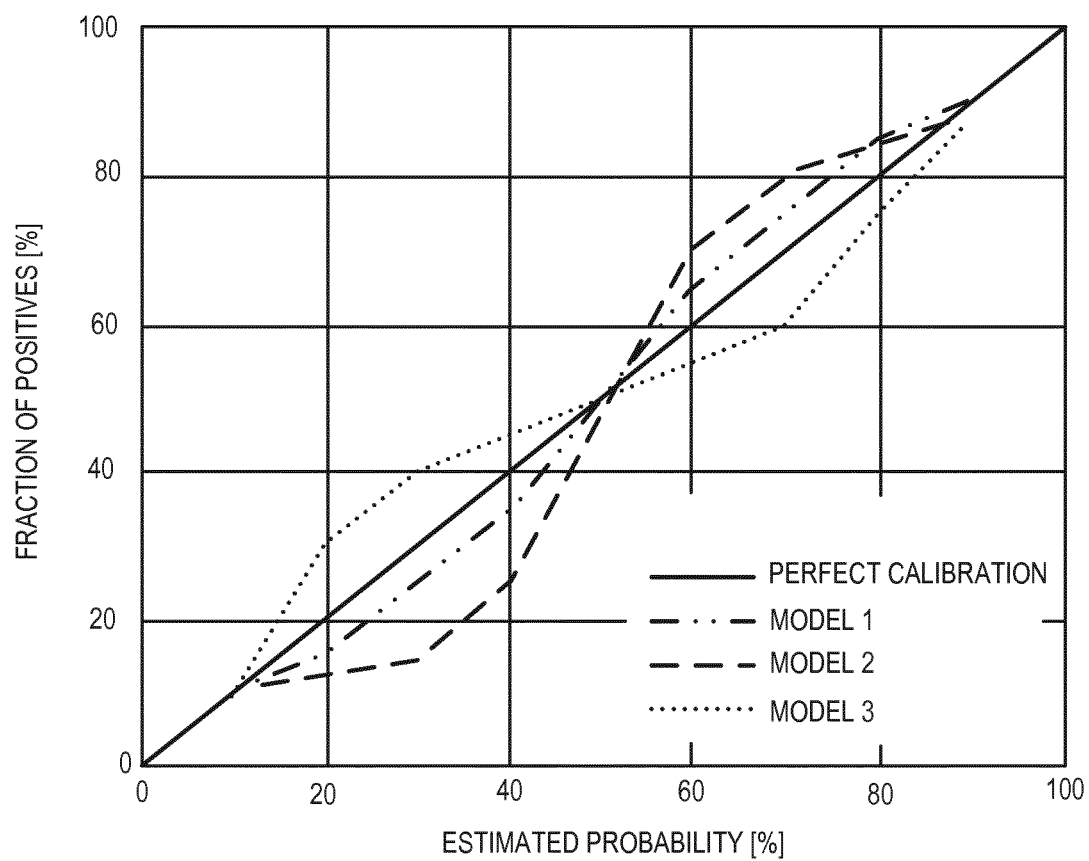
FIG. 2 is a graph illustrating modeling according to an embodiment.

In one embodiment, the probabilities between frequencies are compared by also considering an uncertainty in the estimated probabilities. In practice, a common problem in ML classification is that the estimated probabilities might not reflect the real probabilities, as shown in FIG. 2. In FIG. 2, models 1 and 2 are under-confident and model 3 is over-confident. This situation may not be optimal when comparing the probabilities between different models, which can lead to inefficient and non-optimal search orders. To mitigate these problems, the present disclosure includes the aspect of transforming these probabilities so that they can be compared between different models with different biases. In the ideal case, this can be done by directly transforming the probabilities according to the lines in FIG. 2, such that the estimated probabilities equals the real probability. Because the probabilities in FIG. 2 are estimates, one would also need to consider the uncertainty of the estimates in order to choose the optimal search order.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960a and 960b, and wireless devices 910a, 910b, and 910c. In practice, a wireless network may further include any additional elements suitable to support communication between wireless devices or between a wireless device and another communication device, such as a landline telephone, a service provider, or any other network node or end device. Of the illustrated components, network node 960a and wireless device (WD) 910a are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks (PDNs), optical networks, wide-area networks (WANs), local area networks (LANs), wireless local area networks (WLANs), wired networks, wireless networks, metropolitan area networks, and other networks to enable communication between devices.

Network node 960a and WD 910a comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, eNodeBs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Center or MSCs and MMEs), Operation and Maintenence (O&M) nodes, Operations Support System (OSS) nodes, Self Optimized Network (SON) nodes, positioning nodes (e.g., Evolved-Serving Mobile Location Center or E-SMLCs), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960a includes processing circuitry 970, device readable medium 980, interface 990, auxiliary equipment 984, power source 986, power circuitry 987, and antenna 962. Although network node 960a illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960a are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960a may be composed of multiple physically separate components (e.g., a NodeB component and a RNC component, or a BTS component and a BSC component, etc.), which may each have their own respective components. In certain scenarios in which network node 960a comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960a may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960a may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960a.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960a components, such as device readable medium 980, network node 960a functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, RF transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960a as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960a. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960a may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as multiple-input and multiple-output (MIMO). In certain embodiments, antenna 962 may be separate from network node 960a and may be connectable to network node 960a through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960a with power for performing the functionality described herein. Power circuitry 987 may receive power from power source 986. Power source 986 and/or power circuitry 987 may be configured to provide power to the various components of network node 960a in a form suitable for the respective components (e.g., at a voltage and current level needed for each respective component). Power source 986 may either be included in, or external to, power circuitry 987 and/or network node 960a. For example, network node 960a may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960a may include additional components beyond those shown in FIG. 9 that may be responsible for providing certain aspects of the network node's functionality, including any of the functionality described herein and/or any functionality necessary to support the subject matter described herein. For example, network node 960a may include user interface equipment to allow input of information into network node 960a and to allow output of information from network node 960a. This may allow a user to perform diagnostic, maintenance, repair, and other administrative functions for network node 960a.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, WD 910a includes antenna 911, interface 914, processing circuitry 920, device readable medium 930, user interface equipment 932, auxiliary equipment 934, power source 936 and power circuitry 937. WD 910a may include multiple sets of one or more of the illustrated components for different wireless technologies supported by WD 910, such as, for example, GSM, Wide Code Division Multiplexing Access (WCDMA), LTE, NR, WiFi®, WiMAX, NB-IoT, or Bluetooth® wireless technologies, just to mention a few. These wireless technologies may be integrated into the same or different chips or sets of chips as other components within WD 910a.

Antenna 911 may include one or more antennas or antenna arrays, configured to send and/or receive wireless signals, and is connected to interface 914. In certain alternative embodiments, antenna 911 may be separate from WD 910a and be connectable to WD 910a through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910a may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910a components, such as device readable medium 930, WD 910a functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910a may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910a as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910a. Such interaction may be of many forms, such as visual, audial, tactile, etc. User interface equipment 932 may be operable to produce output to the user and to allow the user to provide input to WD 910a. The type of interaction may vary depending on the type of user interface equipment 932 installed in WD 910a. For example, if WD 910a is a smart phone, the interaction may be via a touch screen; if WD 910*a* is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910*a*. User interface equipment 932 may include, for example, a speaker, a display, vibrating circuitry, a USB port, a headphone interface, or other output circuitry. Using one or more input and output interfaces, devices, and circuits, of user interface equipment 932, WD 910*a* may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910*a* may further comprise power circuitry 937 for delivering power from power source 936 to the various parts of WD 910*a* which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910*a* may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910*a* to which power is supplied.

Figure 10:
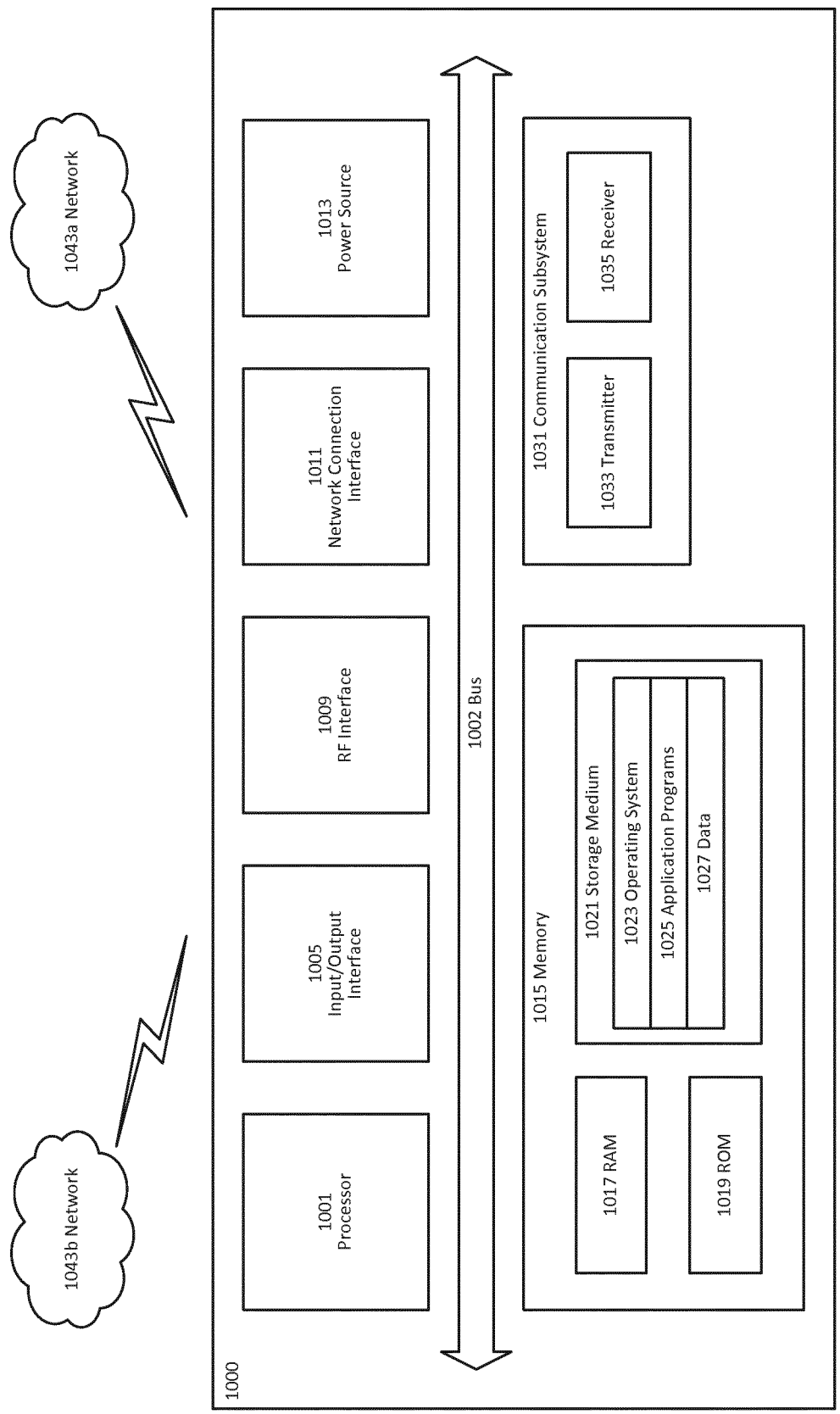
FIG. 10 illustrates an exemplary UE according to an embodiment.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the 3GPP, including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3GPP, such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, field-programmable gate array or FPGA, application-specific integrated circuit or ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, Transmission Control Protocol (TCP)/Internet Protocol (IP), Synchronous Optical Networking (SONET), Asynchronous Transfer Mode (ATM), or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
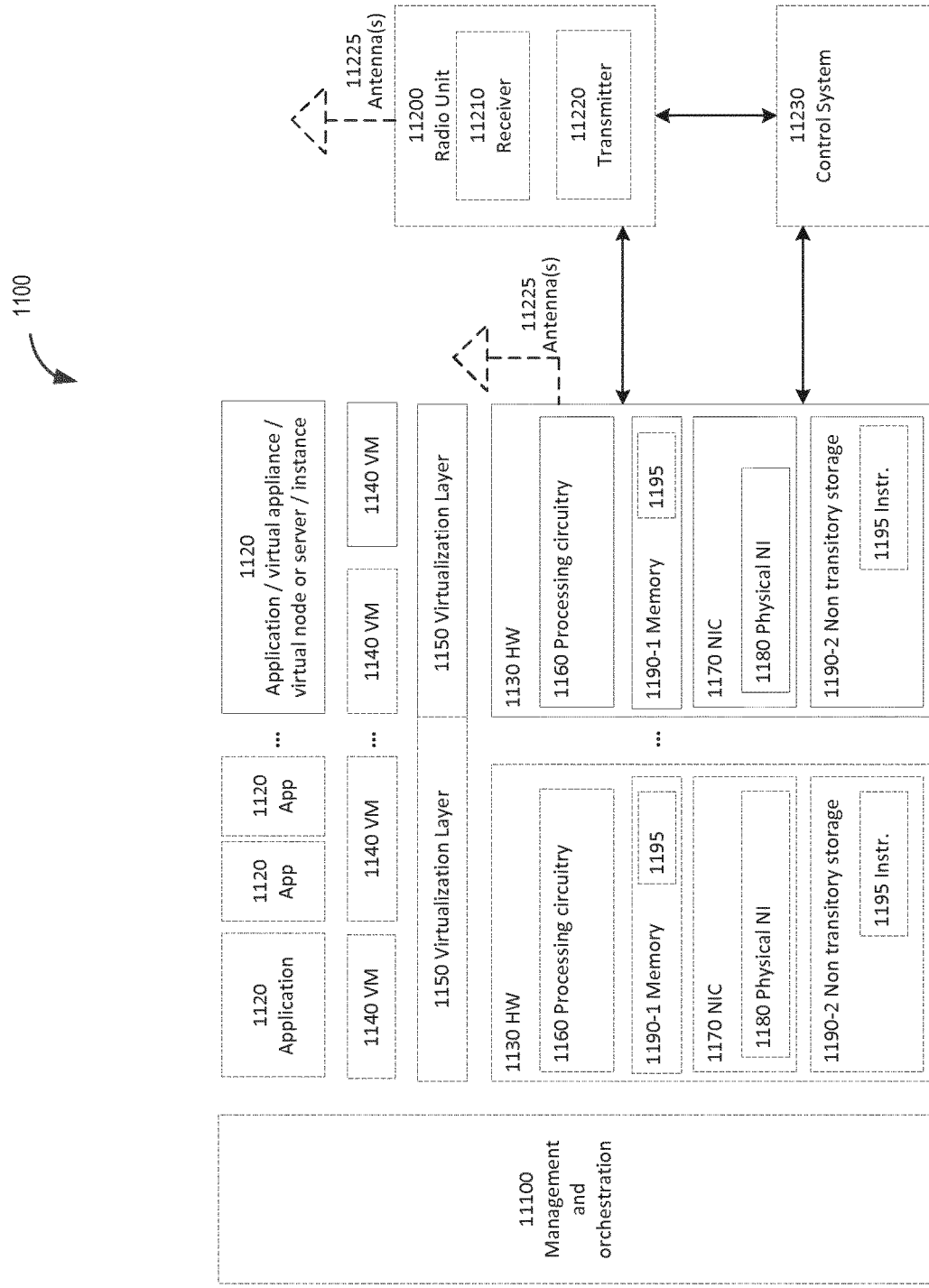
FIG. 11 is a block diagram illustrating an exemplary virtualization environment according to an embodiment.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
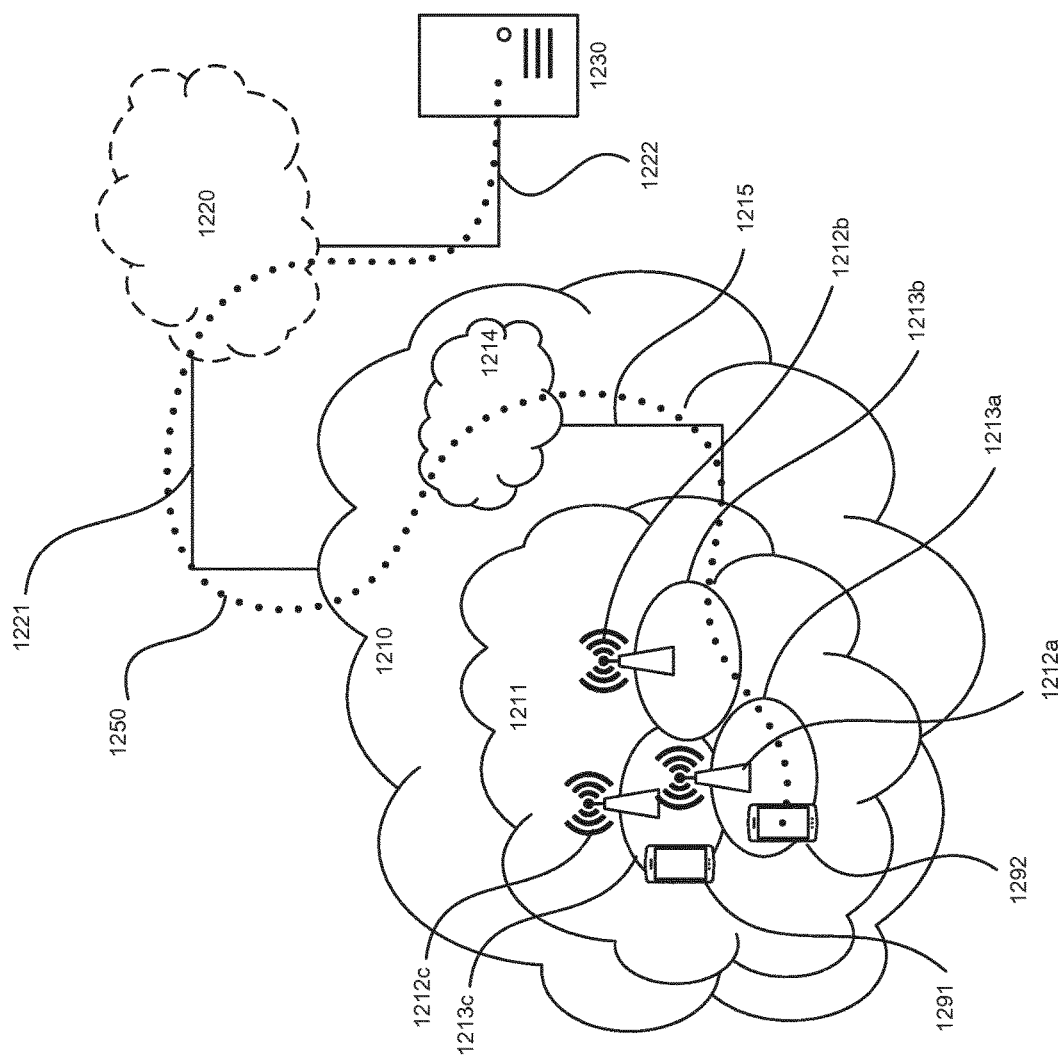
FIG. 12 illustrates an exemplary telecommunication network connected via an intermediate network to a host computer according to an embodiment.

FIG. 12 illustrates a telecommunication network connected via an intermediate network to a host computer in accordance with some embodiments. In particular, with reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
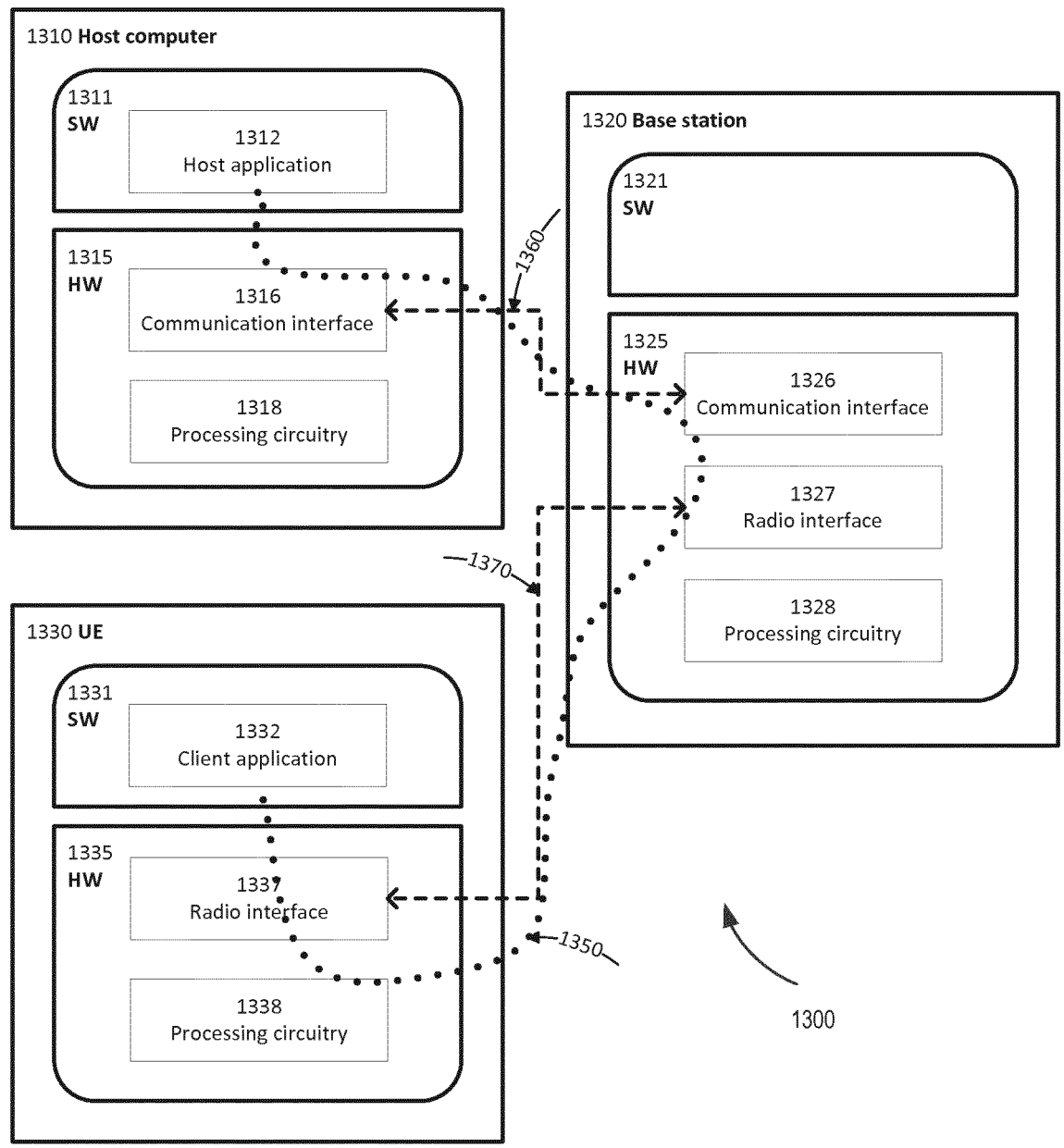
FIG. 13 illustrates an exemplary host computer communicating via a base station with a user equipment over a partially wireless connection according to an embodiment.

Example implementations, in accordance with an embodiment, of the UE, base station and host computer discussed in the preceding paragraphs will now be described with reference to FIG. 13. FIG. 13 illustrates host computer communicating via a base station with a user equipment over a partially wireless connection in accordance with some embodiments In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may reduce the time required for an inter-frequency handover process and thereby provide benefits such as increased system performance and reduced system latency.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
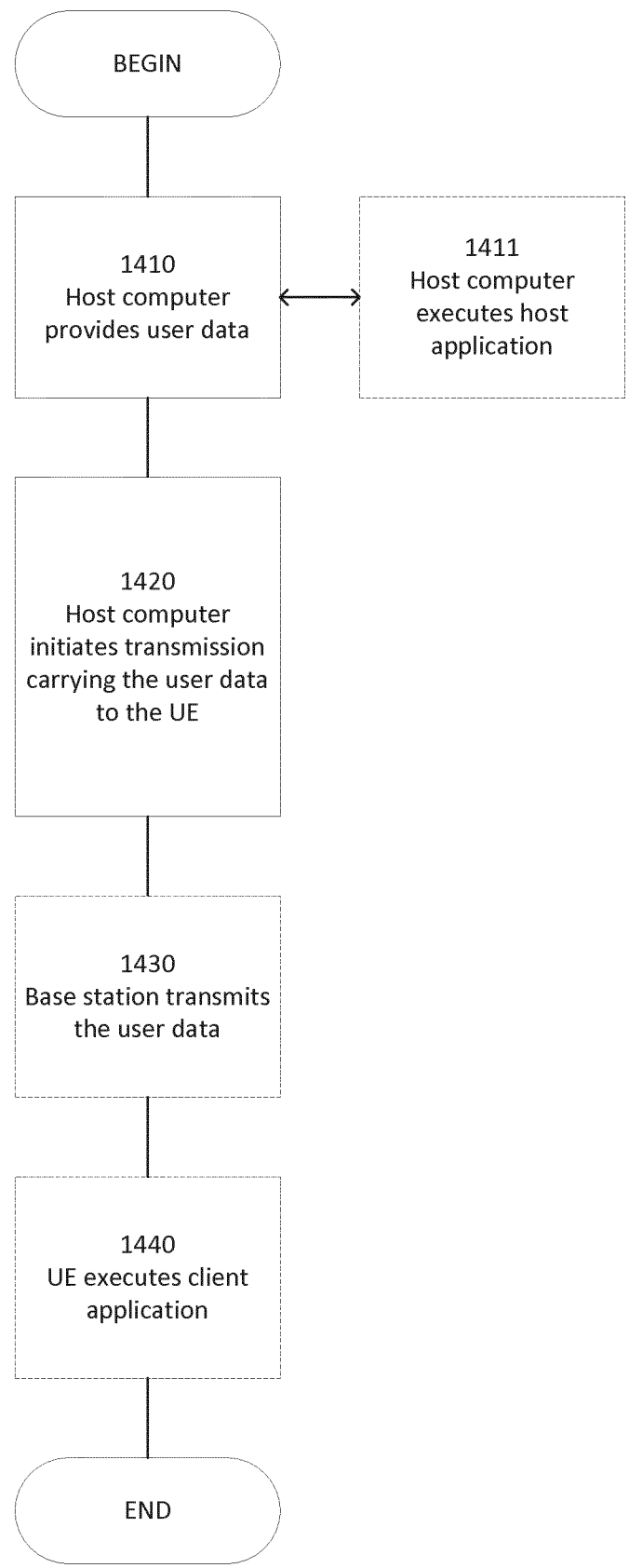
FIG. 14 is a flow chart illustrating an exemplary method implemented in a communication system according to an embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
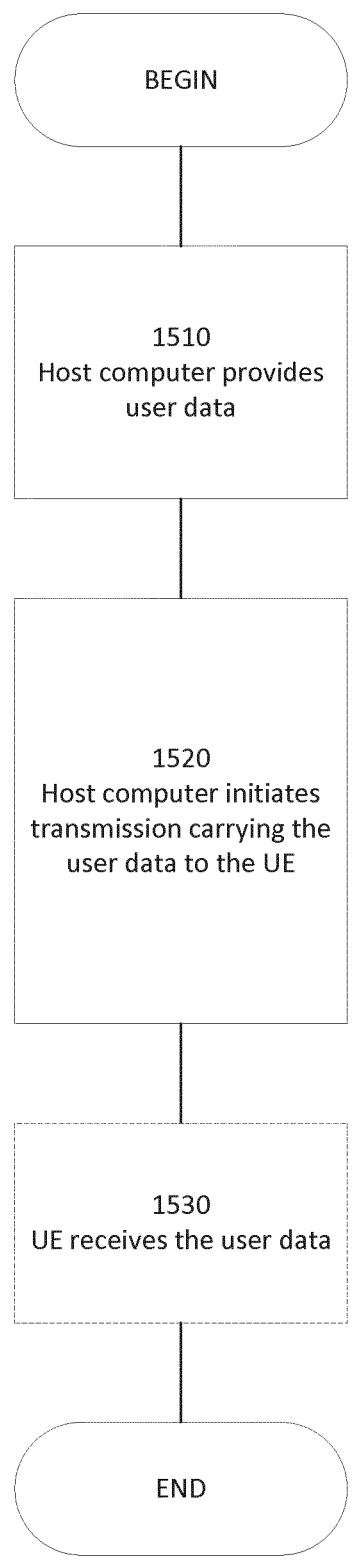
FIG. 15 is a flow chart illustrating a method implemented in a communication system according to an embodiment.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
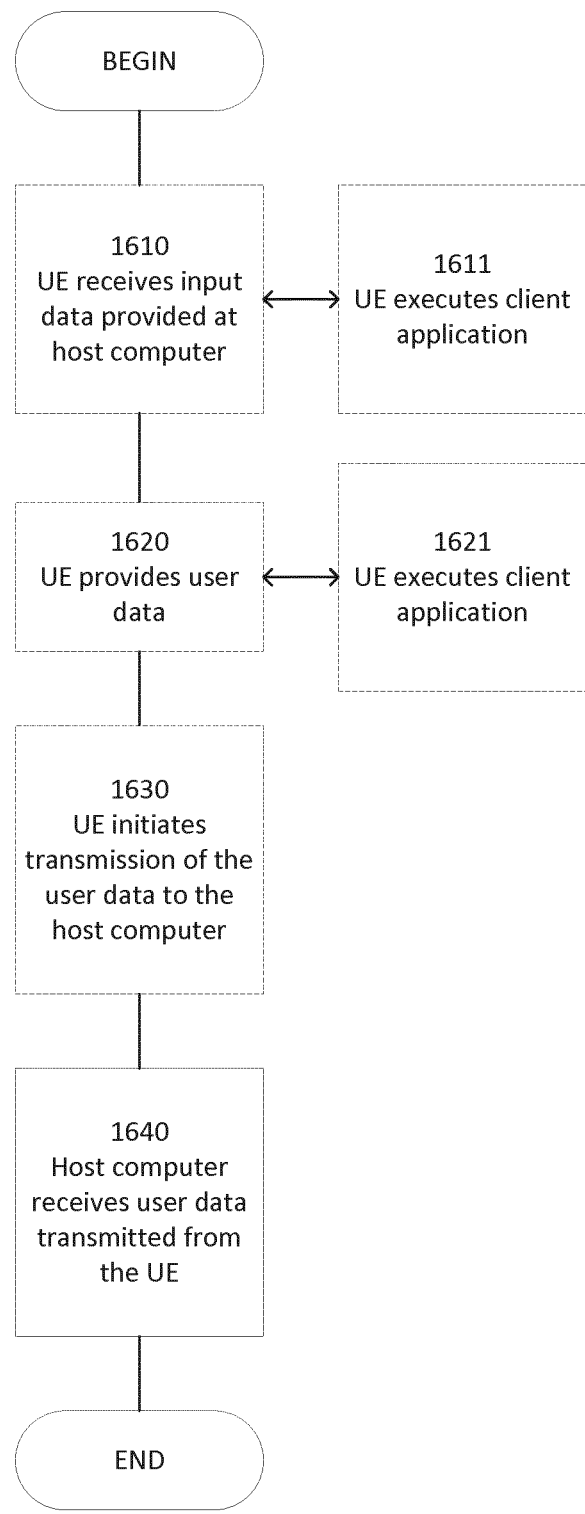
FIG. 16 is a flow chart illustrating a method implemented in a communication system according to an embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
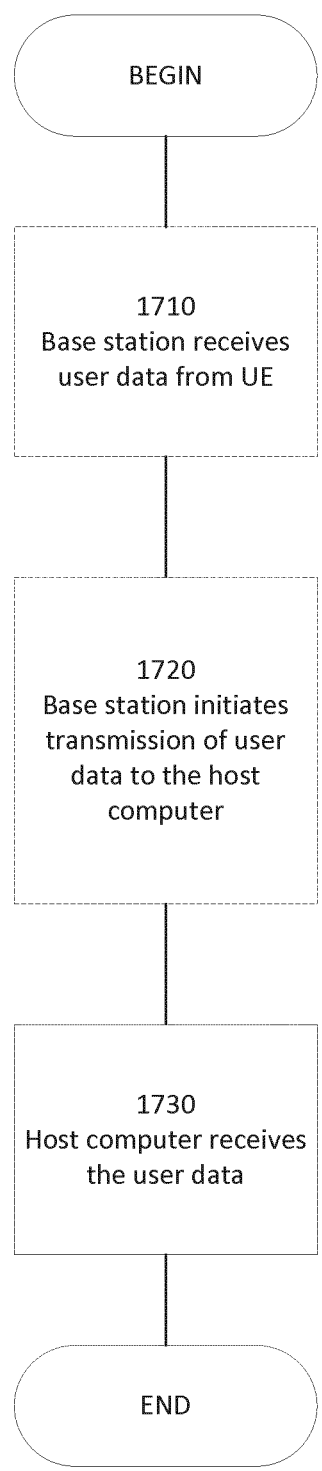
FIG. 17 is a flow chart illustrating a method implemented in a communication system according to an embodiment.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method, performed by a user equipment (UE), for measuring channels available for inter-frequency handover, the method comprising the UE:
   determining a channel order defining a sequence of channels to be successively measured for availability for inter-frequency handover, wherein the channel order is based on an uncertainty in probability; and
   performing measurement of the channels according to the channel order.

2. The method claim 1, wherein the determining a channel order comprises receiving information indicating the channel order at the UE.

3. The method of claim 2, wherein the determining the channel order comprises receiving the information indicating the channel order and the status of a battery level of the UE.

4. The method of claim 1, wherein the channel order is a function of probabilities of coverage for each of the channels.

5. The method of claim 1, wherein the channel order is selected so as to optimize search time duration.

6. The method of claim 1, wherein the channel order is selected based on weighting derived from channel-specific frequency information.

7. The method of claim 6, wherein the channel-specific frequency information comprises a frequency priority.

8. The method of claim 1, wherein the channel order is based on overlap information.

9. The method of claim 1, wherein the channel order is selected based on probability calibration for the channels.

10. The method of claim 1, wherein the method further comprises the UE handing over to a detected cell according to the sequence of channels by switching an on-going communication to the detected cell.

11. A method, performed by a network node, for channel selection for inter-frequency handover, the method comprising the network node:
   generating information usable by a user equipment (UE) for determining a sequence of channels to be successively measured by the UE for availability for inter-frequency handover;
   transmitting the information to the UE;
   receiving one or more inter-frequency measurement results of a first carrier frequency according to the sequence of channels indicated by the transmitted information;
   updating a coverage probability estimate for determining an updated sequence of channels;
   transmitting further information to the user equipment indicating an updated sequence of channels; and
   performing an inter-frequency handover action.

12. The method of claim 11, wherein the information comprises a channel order defining the sequence of channels.

13. The method of claim 12, wherein the channel order is selected so as to optimize search time duration.

14. The method of claim 12, wherein the channel order is selected based on weighting derived from channel-specific frequency information.

15. The method of claim 14, wherein the channel-specific frequency information comprises a frequency priority.

16. The method of claim 12, wherein the channel order is determined by machine learning techniques.

17. The method of claim 11, wherein the method further comprises:
   the network node receiving one or more inter-frequency measurement results based on the transmitted information; and
   the network node performing an inter-frequency handover action.

18. A user equipment (UE) adapted to measure channels available for inter-frequency handover, the UE comprising:
   processing circuitry;
   memory containing instructions executable by the processing circuitry whereby the UE is operative to:
      determine a channel order defining a sequence of channels to be successively measured for availability for inter-frequency handover, wherein the channel order is based on an uncertainty in probability; and
      perform measurement of the channels according to the channel order.

19. The UE of claim 18, wherein the instructions are such that the UE is operative to determine the channel order by receiving information indicating the channel order.

20. The UE of claim 18, wherein the channel order is a function of probabilities of coverage for each of the channels.

21. A base station adapted for channel selection for inter-frequency handover, the base station comprising:
   processing circuitry;
   memory containing instructions executable by the processing circuitry whereby the base station is operative to:
      generate information usable by a user equipment (UE) for determining a sequence of channels to be successively measured by the UE for availability for inter-frequency handover;
      transmit the information to the UE;
      receive one or more inter-frequency measurement results of a first carrier frequency according to the sequence of channels indicated by the transmitted information;
      update a coverage probability estimate for determining an updated sequence of channels;
      transmit further information to the user equipment indicating an updated sequence of channels; and
      perform an inter-frequency handover action.

22. The base station of claim 21, wherein the information comprises a channel order defining the sequence of channels.

\* \* \* \* \*